US011939073B2

(12) United States Patent
Imel et al.

(10) Patent No.: US 11,939,073 B2
(45) Date of Patent: Mar. 26, 2024

(54) STARTING METHODS FOR HYBRID-ELECTRIC AIRCRAFT

(71) Applicant: Pratt & Whitney Canada Corp., Longueuil (CA)

(72) Inventors: Paul C. Imel, Hartford, CT (US); Sebastien Bergeron, Chambly (CA); Etienne Plamondon, Verdun (CA); Samuel Gosselin-Brisson, Longueuil (CA); Leonid Guerchkovitch, Dollard des Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 259 days.

(21) Appl. No.: 17/085,006

(22) Filed: Oct. 30, 2020

(65) Prior Publication Data
US 2022/0135240 A1    May 5, 2022

(51) Int. Cl.
| | |
|---|---|
| B64D 31/06 | (2006.01) |
| B64D 27/02 | (2006.01) |
| B64D 27/24 | (2006.01) |
| B64D 35/08 | (2006.01) |
| B64D 41/00 | (2006.01) |

(52) U.S. Cl.
CPC ............. *B64D 31/06* (2013.01); *B64D 27/02* (2013.01); *B64D 27/24* (2013.01); *B64D 35/08* (2013.01); *B64D 41/00* (2013.01); *B64D 2027/026* (2013.01)

(58) Field of Classification Search
CPC ........ B64D 27/02; B64D 27/24; B64D 31/06; B64D 31/14; B64D 35/08; B64D 41/00; B64D 2027/026
See application file for complete search history.

(56) References Cited

U.S. PATENT DOCUMENTS

| | | | | |
|---|---|---|---|---|
| 8,324,746 | B2 * | 12/2012 | Bradbrook | ................ F02C 3/10 290/1 A |
| 8,752,392 | B2 | 6/2014 | Gazzino et al. | |
| 9,428,267 | B2 * | 8/2016 | DeVita | ..................... F02C 7/262 |

(Continued)

FOREIGN PATENT DOCUMENTS

| | | |
|---|---|---|
| EP | 2962885 A1 | 1/2016 |
| RU | 2694695 C1 | 7/2019 |
| WO | 2020067446 A1 | 4/2020 |

OTHER PUBLICATIONS

Extended European Search Report dated Mar. 7, 2022, issued during the prosecution of European Patent Application No. EP 21205767.3.

*Primary Examiner* — Jason H Duger
(74) *Attorney, Agent, or Firm* — Norton Rose Fulbright Canada LLP

(57) ABSTRACT

A method includes using an electric motor to start a thermal engine. The electric motor and thermal engine are connected to one another as the electric motor and the thermal engine of a hybrid-electric power plant in an aircraft. The electric motor can be connected to a combining gear box. The thermal engine can be connected to the combining gear box so that the electric motor and the thermal engine can provide torque to the combining gear box in a parallel hybrid-electric configuration. The combining gearbox can output torque to an air mover for providing thrust to the aircraft.

13 Claims, 1 Drawing Sheet

(56) References Cited

U.S. PATENT DOCUMENTS

| | | | | |
|---|---|---|---|---|
| 2010/0013223 | A1* | 1/2010 | Certain | B60K 6/387 |
| | | | | 290/46 |
| 2013/0204506 | A1* | 8/2013 | Ertz | F02N 11/04 |
| | | | | 290/34 |
| 2014/0010652 | A1* | 1/2014 | Suntharalingam | B64D 27/02 |
| | | | | 475/5 |
| 2019/0323427 | A1* | 10/2019 | Mackin | B64D 27/24 |
| 2019/0344898 | A1* | 11/2019 | Scothern | B64D 27/14 |
| 2020/0039657 | A1* | 2/2020 | Ransom | F02K 3/04 |
| 2020/0083791 | A1* | 3/2020 | Latulipe | B64D 27/24 |
| 2020/0277062 | A1* | 9/2020 | Becker | B64D 31/02 |
| 2020/0277063 | A1* | 9/2020 | Thomassin | B64D 27/18 |

\* cited by examiner

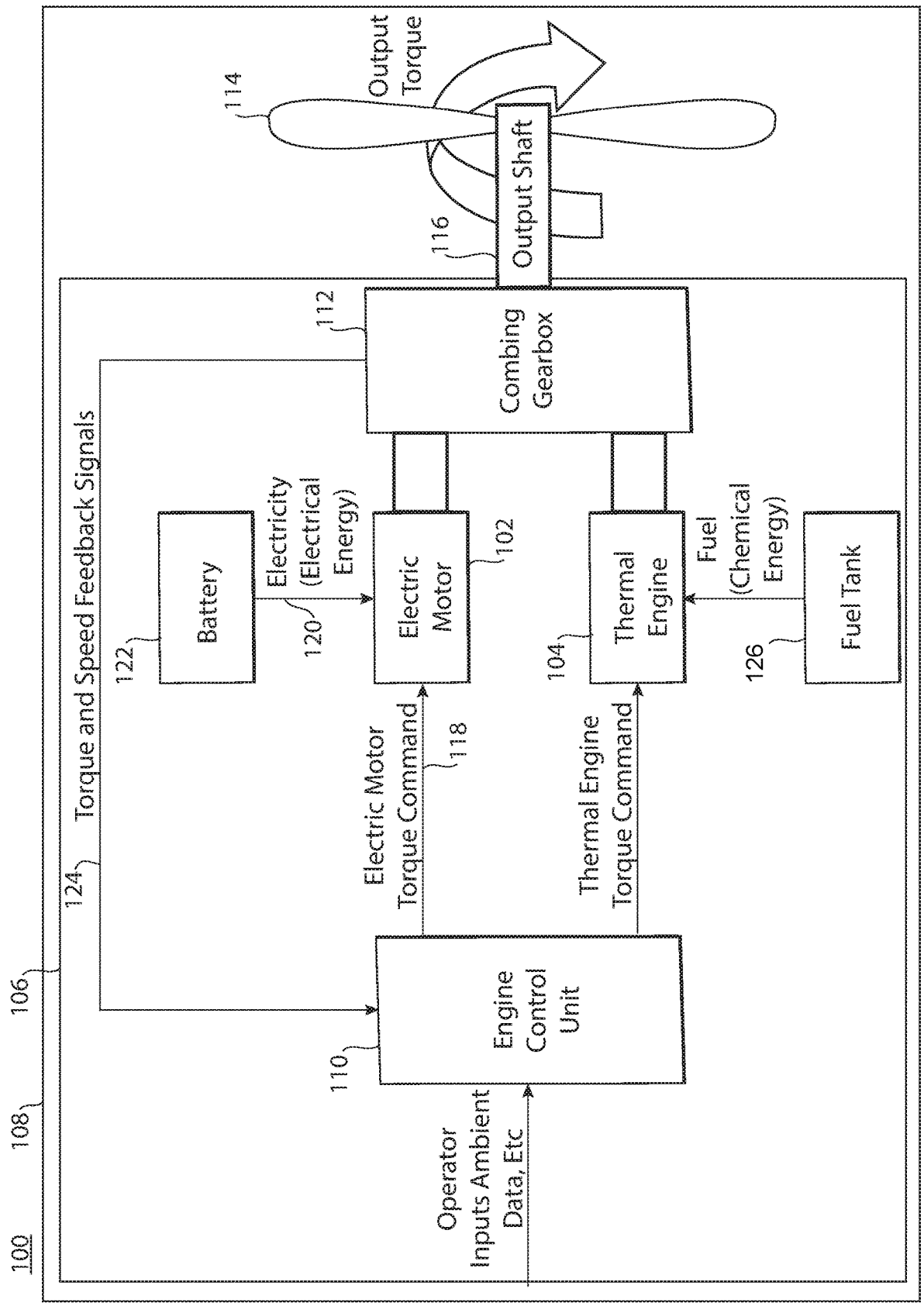

STARTING METHODS FOR HYBRID-ELECTRIC AIRCRAFT

BACKGROUND

1. Field

The present disclosure relates to hybrid-electric aircraft, and more particularly to starting hybrid-electric aircraft.

2. Description of Related Art

Traditional aircraft engine starters provide a set amount of torque and resulting speed with no ability to be adjusted while in service. Hardware associated with engine starter systems has a weight and complexity, requiring maintenance, which impact on operation of the aircraft. To increase aircraft performance and dispatchability, it is desirable for starters to be adjustable and to serve multiple functions.

The conventional techniques have been considered satisfactory for their intended purpose. However, there is an ever present need for improved systems and methods for starting methods for aircraft. This disclosure provides a solution for this need.

SUMMARY

A method includes using an electric motor to start a thermal engine. The electric motor and thermal engine are connected to one another as the electric motor and the thermal engine of a hybrid-electric power plant in an aircraft.

The electric motor can be connected to a combining gear box. The thermal engine can be connected to the combining gear box so that the electric motor and the thermal engine can provide torque to the combining gear box in a parallel hybrid-electric configuration. The combining gearbox can output torque to an air mover for providing thrust to the aircraft. Using the electric motor to start the thermal engine can include providing torque from the electric motor to the combining gear box, and providing the torque from the combining gear box to the thermal engine to drive rotation in the thermal engine starting from a state of rest to reach a compression ratio where combustion can be initiated in the thermal engine.

The method can include, after using the electric motor to start the thermal engine, powering the aircraft with the hybrid-electric power plant with combined power from the electric motor and the thermal engine through take-off, and powering the aircraft with the hybrid-electric power plant with combined power from the electric motor and the thermal engine while climbing to cruise altitude. The method can include powering the aircraft with the hybrid-electric power plant with power exclusively from the thermal engine after reaching cruise altitude.

The method can include issuing a command from an engine control unit (ECU) to an electrical system coupled to the electric motor to bring the thermal engine to a given start speed. Bringing the thermal engine to a given start speed can include using engine speed feedback to the ECU. The ECU can command the electric motor to decrease torque after the given start speed is reached. The method can include flying the aircraft through a mission of take-off, climb, cruise, and landing without using the electric motor as a generator. It is also contemplated that the method can include using the electric motor as a generator.

A system includes an electric motor. A thermal engine is connected to the electric motor as a hybrid-electric power plant in an aircraft. An engine control unit (ECU) is connected to use the electric motor to start the thermal engine.

The electric motor can be connected to a combining gear box. The thermal engine can be connected to the combining gear box so that the electric motor and the thermal engine can provide torque to the combining gear box in a parallel hybrid-electric configuration. The combining gearbox can be connected to an air mover for providing thrust to the aircraft. The electric motor and the thermal engine can have horse power ratings within one order of magnitude of each other An electrical system can be coupled to the electric motor to bring the thermal engine to a given start speed. A feedback loop can be connected to use engine speed feedback to the ECU to bring the thermal engine to the given start speed.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the parallel hybrid-electric power plant for an aircraft.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to for starting hybrid-electric aircraft.

The system 100 includes an electric motor 102. A thermal engine 104 is connected to the electric motor 102 as a hybrid-electric power plant 106 in an aircraft 108. An engine control unit (ECU) 110 is connected to use the electric motor 102 to start the thermal engine 104.

The electric motor 102 is mechanically connected to a combining gear box 112. The thermal engine 104 is mechanically connected to the combining gear box 112 so that the electric motor 102 and the thermal engine 104 can both provide torque to the combining gear box 112 in a parallel hybrid-electric configuration. The combining gearbox 112 is connected to an air mover 114, e.g. directly or indirectly by an output shaft 116, for providing thrust to the aircraft 108. The electric motor 102 and the thermal engine 104 have horse power ratings within one order of magnitude of each other. For example, the thermal engine 104 and electric motor 102 can each be rated for about 1000 hp (746 kW) mechanical output.

An electrical system, including the connections 118 and 120 from the ECU 110 and battery 122, and is coupled to the electric motor 102 to bring the thermal engine 104 to a given start speed. A feedback loop 124 is connected to use engine speed feedback to the ECU 110 to bring the thermal engine 104 to the given start speed. Fuel from the fuel tank 126, and commands 128 from the ECU 110 are supplied to the thermal engine 104 during and after startup. The ECU 110 can use commands from aircraft systems and an operator to control the electric motor 102 and thermal engine 104. Those skilled in the art will readily appreciate that other parameters can be used for feedback to the ECU 110 and not just speed. For example, the ECU 110 can drive the thermal engine 104 until the measured compression reaches a target, or until the ECU 110 calculates a value based on multiple parameters that indicates stable combustion achieved or any other suitable feedback.

A method includes using an electric motor 102 to start a thermal engine 104. Using the electric motor 102 to start the thermal engine 104 includes providing torque from the electric motor 102 to the combining gear box 112, and providing the torque from the combining gear box 112 to the thermal engine 104 to drive rotation in the thermal engine 104 starting from a state of rest to reach a compression ratio where combustion can be initiated in the thermal engine 104.

The method includes, after using the electric motor 102 to start he thermal engine 104, powering the aircraft 108 with the hybrid-electric power plant 106 with combined power from the electric motor 102 and the thermal engine 104 through take-off, and powering the aircraft 108 with the hybrid-electric power plant 106 with combined power from the electric motor 102 and the thermal engine 104 while climbing to cruise altitude. The method can include powering the aircraft 108 with the he hybrid-electric power plant 106 using power exclusively from the thermal engine 104 after reaching cruise altitude. It is also contemplated that the thermal engine 104 could be completely powered down and the aircraft can be exclusively powered by electric motor 102.

The method includes issuing a command from an ECU 110 to an electrical system coupled to the electric motor 102 to bring the thermal engine 104 to a given start speed. Bringing the thermal engine 104 to a given start speed includes using engine speed feedback to the ECU 110. The ECU 110 commands the electric motor 102 to decrease torque after the given start speed is reached. The method can include flying the aircraft 108 through a mission of take-off, climb, cruise, and landing without ever using the electric motor 102 as a generator. It is also contemplated that the electric motor 102 can be used as a generator.

The potential benefits of this invention, utilizing the electrical drivetrain of a hybrid-electric propulsion system as a thermal engine starter can include the following. A minimal use conventional starter can be removed/omitted from the architecture, reducing weight and complexity. Since the APU (auxiliary power unit) is not used to supply energy to the engine start process on top of its normal ground operating electrical load, its design can be optimized to reduce size, weight, and power. Since the APU is not used to supply energy to the engine start process, fuel savings are realized. By not using traditional air turbine starters, plumbing to route airflow may be removed, reducing complexity and weight. Since another thermal engine on the same aircraft need not be used to provide energy for the start process, fuel savings can be realized. Compared to traditional electric starter systems, electricity for the engine start can come from a larger, multi-role battery system. Economies of scale result in higher energy densities (and thus lower weight) of the portion of the battery used to start the engine compared with smaller, legacy battery systems.

Due to the controllability of the electric drivetrain and ability to command specific speeds/torques during the start sequence, it is possible to customize the engine start profile by setting the acceleration rate, dwell states (sub-idle/idle/above-idle), start duration, and the like. This functionality allows for start profiles customized for specific uses including, but not limited to: extending the re-start envelope at altitude (currently limited by an APU's decrease in power at altitude), increasing start torque in cold temperatures where the resisting friction/torque is fairly high and traditional engine start methods are less effective, and setting engine start rotational speeds based on ambient conditions to reduce the amount of energy and time spent spinning the engine for start. Due to the feedback control of the electric drivetrain, the controller can monitor torque and provide active torque limiting to prevent mechanical failure (or further mechanical failure) in the event mechanical rotation is hindered.

It is also contemplated that the output of a combining gear box can drive a generator that provides electricity to electrically powered fans distributed around the aircraft. Thus it is not necessarily required that the combining gearbox directly drive an air mover mechanically.

The methods and systems of the present disclosure, as described above and shown in the drawings, provide for starting hybrid-electric power plants in aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
setting a start speed for a thermal engine of a hybrid-electric power plant in an aircraft based on ambient conditions;
using an electric motor to start the thermal engine by bringing the thermal engine to the start speed and limiting a torque output of the electric motor to prevent mechanical failure when mechanical rotation of the electric motor is hindered, wherein:
the electric motor and thermal engine are connected to one another as the electric motor and the thermal engine of the hybrid-electric power plant in the aircraft;
the electric motor is connected to a combining gear box;
the thermal engine is connected to the combining gear box so that the electric motor and the thermal engine can provide torque to the combining gear box in a parallel hybrid-electric configuration;
flying the aircraft through a mission of take-off, climb, cruise, and landing without using the electric motor as a generator;
after using the electric motor to start the thermal engine:
powering the aircraft with the hybrid-electric power plant with combined power from the electric motor and the thermal engine driving the combining gear box through take-off; and
powering the aircraft with the hybrid-electric power plant with combined power from the electric motor and the thermal engine driving the combining gear box while climbing to cruise altitude.

2. The method as recited in claim 1, wherein the combining gear box outputs torque to an air mover for providing thrust to the aircraft.

3. The method as recited in claim 2, wherein using the electric motor to start the thermal engine includes providing torque from the electric motor to the combining gear box, and providing the torque from the combining gear box to the thermal engine to drive rotation in the thermal engine starting from a state of rest to reach a compression ratio where combustion can be initiated in the thermal engine.

4. The method as recited in claim 1, further comprising powering the aircraft with the hybrid-electric power plant with power exclusively from the thermal engine after reaching cruise altitude.

5. The method as recited in claim 1, further comprising issuing a command from an engine control unit (ECU) to an electrical system coupled to the electric motor to bring the thermal engine to the start speed.

6. The method as recited in claim 5, wherein bringing the thermal engine to the start speed includes using engine speed feedback to the ECU.

7. The method as recited in claim 5, wherein the ECU commands the electric motor to decrease torque after the start speed is reached.

8. The method as recited in claim 1, comprising:
using a first torque output from the electric motor to start the thermal engine at a first ambient temperature; and
using a second torque output from the electric motor higher than the first torque output to start the thermal engine at a second ambient temperature colder than the first ambient temperature.

9. A system comprising:
an electric motor;
a thermal engine connected to the electric motor as a hybrid-electric power plant in an aircraft; and
an engine control unit (ECU) connected to set a start speed for the thermal engine based on ambient conditions, use the electric motor to start the thermal engine by bringing the thermal engine to the start speed, and limit a torque output of the electric motor during starting of the thermal engine to prevent mechanical failure when mechanical rotation of the electric motor is hindered, wherein:
the electric motor is connected to a combining gear box;
the thermal engine is connected to the combining gear box so that the electric motor and the thermal engine can provide torque to the combining gear box in a parallel hybrid-electric configuration,
the ECU is configured for flying the aircraft through a mission of take-off, climb, cruise, and landing without using the electric motor as a generator, and after using the electric motor to start the thermal engine:
powering the aircraft with the hybrid-electric power plant with combined power from the electric motor and the thermal engine driving the combining gear box through take-off; and
powering the aircraft with the hybrid-electric power plant with combined power from the electric motor and the thermal engine driving the combining gear box while climbing to cruise altitude.

10. The system as recited in claim 9, wherein the electric motor and the thermal engine have horse power ratings within one order of magnitude of each other.

11. The system as recited in claim 10, wherein the combining gear box is connected to an air mover for providing thrust to the aircraft.

12. The system as recited in claim 9, further comprising an electrical system coupled to the electric motor to bring the thermal engine to the start speed.

13. The system as recited in claim 12, further comprising a feedback loop connected to use engine speed feedback to the ECU to bring the thermal engine to the start speed.

* * * * *